United States Patent Office
3,222,642
Patented Dec. 7, 1965

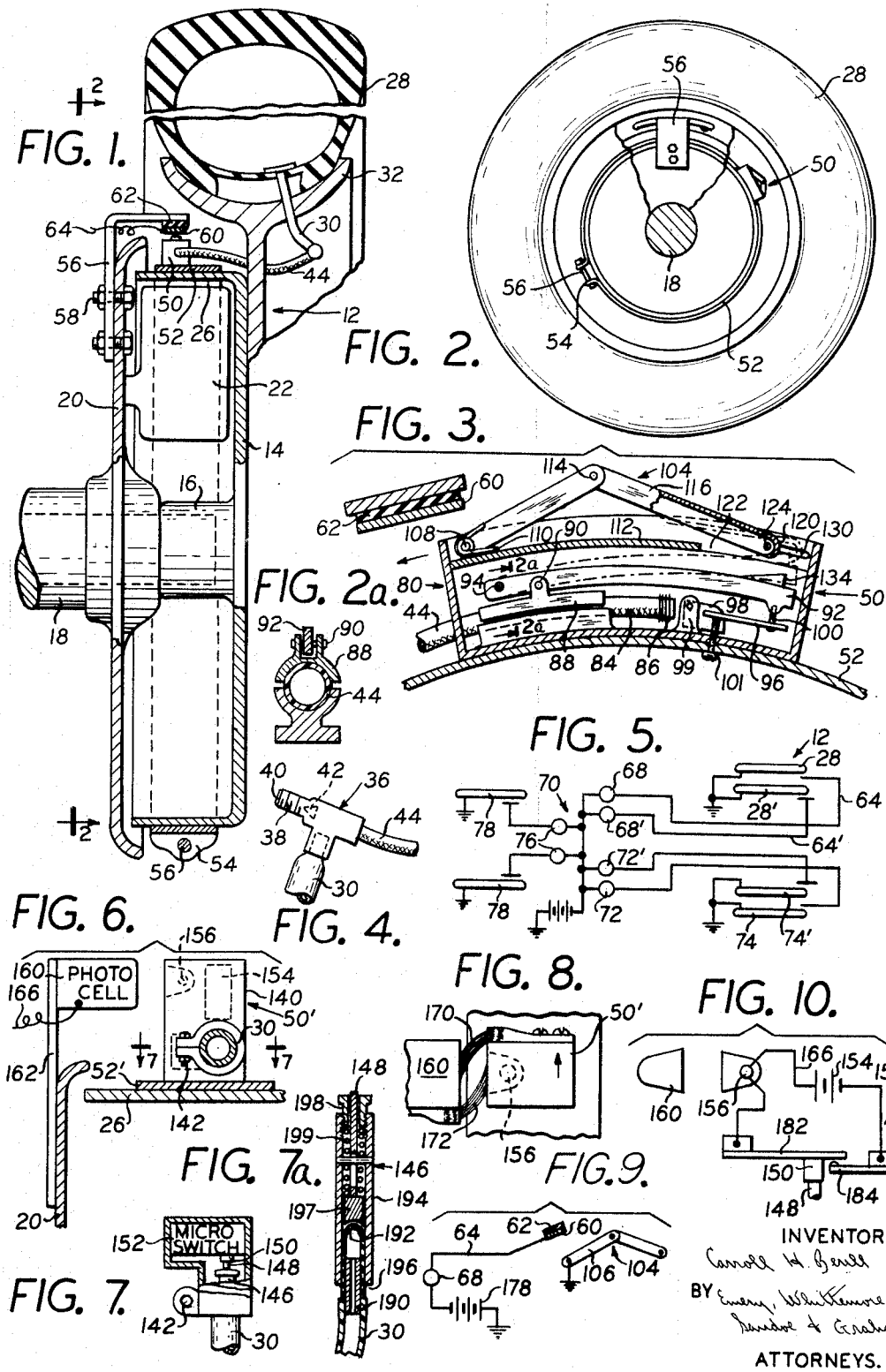

3,222,642
LOW PRESSURE INDICATOR FOR VEHICLE TIRES
Carroll H. Berill, Pickwick Arms, 230 E. 51st St.,
New York, N.Y.
Filed Dec. 5, 1962, Ser. No. 242,554
10 Claims. (Cl. 340—58)

This invention relates to apparatus for indicating a drop in air pressure in a vehicle tire.

The invention is intended particularly for truck tires, and has its greatest utility on wheels having double tires. In the case of any wheel which has two tires it is difficult to determine a loss of pressure by one tire since the tire does not tend to flatten so long as the companion tire supports the weight of the vehicle. However, as the pressure in one tire continues to drop, the other tire flattens to some extent under the extra load and the two tires rub against one another, with resulting damage. In a long run, the tires may be ruined.

The invention not only serves as a safety device for preventing damage to tires where the pressure has dropped below safe limits; but it also prevents blowouts where one tire, on a double-tire wheel, is unable to support the load alone. Blowouts at high speeds are dangerous and sometimes result in accidents.

One object of the invention is to provide apparatus for detecting loss of pressure in a vehicle tire and for indicating the loss of pressure to an operator of the vehicle.

Another object is to provide an improved pressure-operated capsule which is small and light so that it can be located in a position on a brake drum and protected from freezing by heat from the brakes. The light weight eliminates unbalancing of the wheel and resulting vibration.

Another object is to provide reliable and simple detection equipment for indicating drop in tire pressure below a predetermined limit.

The invention is constructed so that it can be applied to existing automobiles and trucks without any change in the construction of the wheel. One modification of the invention utilizes a contact on the wheel which touches a complementary contact on a fixed bracket whenever the tire pressure is below the set limit. Another modification is electronic and has a pressure-responsive device on the wheel which radiates energy to a fixed detector on the vehicle when the tire pressure is low.

Other objects, features and advantages of the invention will appear or be pointed out as the description proceeds.

In the drawing, forming a part hereof, in which like reference characters indicate corresponding parts in all the views:

FIGURE 1 is a sectional view through an automobile wheel to which the invention is applied;

FIGURE 2 is a view taken on the plane 2—2 of FIGURE 1;

FIGURE 2a is a sectional view taken on the line 2a—2a of FIGURE 3;

FIGURE 3 is a greatly enlarged sectional view of the pressure-responsive device that rotates with the wheel;

FIGURE 4 is a detail view showing the connection of the pressure responsive device with the interior of the tire;

FIGURE 5 is a wiring diagram showing the way in which signals are supplied to a central signal station to inform the driver of a pressure drop in each particular tire of a truck having dual tires on the rear wheels;

FIGURE 6 is a fragmentary sectional view, similar to a portion of FIGURE 1, but showing a modified form of the invention;

FIGURE 7 is a sectional view taken on the line 7—7 of FIGURE 6;

FIGURE 7a is an enlarged detail view, mostly in section, of a portion of the structure shown in FIGURE 7;

FIGURE 8 is a top plan view of the apparatus shown in FIGURE 6;

FIGURE 9 is a wiring diagram for the apparatus shown in FIGURES 1–3; and

FIGURE 10 is a wiring diagram for the modified form of the invention shown in FIGURES 6–8.

FIGURE 1 is a diagrammatic showing of a conventional automobile wheel 12 which is secured to a hub portion 14 on an axle 16 extending through an axle housing 18. There is a fixed flange 20 secured to the axle housing and on which the brake shoes are mounted; the brake shoes being designated generally by the reference character 22 but without any showing of their operating mechanism.

The wheel has a brake drum 26; and a tire 28. A valve stem 30 extends from the interior of the tire and through a rim 32 on which the tire is mounted. In conventional constructions, there is a valve in the valve stem 30.

When this invention is to be applied to an automobile wheel, a branch fitting 36 is placed on the valve stem 30 in place of the conventional cap. This branch fitting 36 has a stem 38 which is of a construction similar to a conventional valve stem with outside threads 40 for receiving a cap and with provision inside for receiving a conventional tire valve 42.

At the other end of the branch fitting 36 there is a conduit 44, preferably a flexible plastic hose and this conduit 44 leads from the branch fitting to a pressure-responsive device which will be described. With the branch fitting 36 on the valve stem 30, the tire can be inflated and deflated in the conventional manner through the branch fitting stem 38; but the actual air pressure in the tire is transmitted at all times through the conduit 44 to a pressure-responsive device 50 (FIGURE 1) that rotates as a unit with the wheel 12.

This pressure-responsive device 50 can be located on the wheel in various ways. In the construction illustrated, the pressure-responsive device 50 is secured to a band 52 which extends around the brake drum 26. The band 52 is provided with flanges 54 at opposite ends and these flanges are pulled together by a bolt 56 in the same manner as a hose clamp. The flanges 54, and the bolt 56, are preferably located at the opposite side of the brake drum 26 from the pressure-responsive device 50. If dynamic balance is desired, the flanges 54 and bolt 56 can be made equal in weight to the pressure-responsive device 50.

There is a bracket 56 attached to a fixed part of the vehicle. In the illustrated construction, this bracket 56 is secured to the flange 20 by bolts 58. A portion of the bracket 56 extends outwardly across the brake drum 26 but at a substantial radial spacing from the brake drum. The bracket 56 carries an electric contact 60 which is insulated from the bracket by electrical insulation 62. A conductor 64 leads from the contact 60 to an indicator at a central station on the vehicle, and there are similar conductors 64 coming from all of the wheels of the vehicle.

The operation of the pressure-responsive device 50 will be explained in connection with subsequent views of the drawing, but for the present it can be explained that the contact 60 is located close to the path of movement of the pressure-responsive device 50 as the latter rotates as a unit with the wheel. When pressure in the tire 28 is above a predetermined limit, the pressure-responsive device 50 does not touch the contact 60 as the wheel rotates. However, when there is a drop in the pressure in the tire 28, a movable portion of the pressure-responsive device 50 shifts into a signal-producing position in which it projects radially far enough to touch the contact 60 each time that the pressure-responsive device 50 passes the contact 60; that is, once with each revolution of the wheel.

In the simplest embodiment of the invention, the touching of a portion of the presure-responsive device 50 with the contact 60 grounds the contact on the metal of the vehicle frame, and this closes a circuit through the conductor 64.

FIGURE 5 is a wiring diagram showing the conductor 64 leading from a position adjacent the wheel 12 to an indicator 68, such as a lamp, located at a central signal station 70.

There is another indicator 68' which is in the circuit with a conductor 64' and this circuit is grounded by a pressure-responsive device which may be mounted on the same wheel 12 but in position to indicate reduction in pressure of an inside tire 28'.

There are other indicators 72 and 72' for indicating reduction in presure in tires 74 and 74' on the other back wheel of the truck. Other indicators 76, at the central indicator station 70, provide signals for indicating pressure drop in tires 78 on the front wheels of the truck. It will be noted that the indicators 68, 68', 72, 72', and 76 are in the same relative positions as the tires so that the operator of the vehicle is informed, by the indicators, which tire has lost pressure.

FIGURE 3 shows the construction of the pressure-responsive device 50. There is a housing 80 attached to the band 52. The hose or conduit 44 extends into the housing 80 and has a capsule 84 on one end. This capsule expands and contracts with variation in the pressure in the tire. In the most simplified construction, the capsule 84 is an end portion of the hose or conduit 44 which has a plug in one end around which the wall of the hose is tightly clamped by clamping means 86, preferably a helical section of wire.

A shoe 88 fits over the capsule 84 and this shoe is preferably curved to conform generally to the cylindrical surface of the capsule 84. The shoe is connected, by a pivot 90, to a lever 92; and this lever 92 is supported by a fulcrum pin 94 extending between side walls of the housing 80. The lever 92 is held down by a leaf spring 96 extending from a block 98 pivoted to lugs 99 extending up from the bottom of the housing 80. In the illustrated construction, a link 100 transmits force of the spring 96 to the lever 92. The force of the spring 96 can be adjusted by means of a screw 101 extending loosely through the bottom of the housing 80 and threading into the block 98. Rotation of the screw 101 in one direction rocks the block 98 clockwise about its pivotal connection to the lugs 99 and increases the tension of the spring 96. Rotation of the screw 101 in the other direction rotates the block counterclockwise and decreases the tension of the spring 96.

The pressure-responsive device 50 has a jointed contact arm 104 consisting of a link 106, attached to the housing 80 by a pin 108. This link 106 is urged counterclockwise by a torsion spring 110 which bears against the top of the link 106, and which then has several convolutions extending around the pivot pin 108 and beyond which the other end of the spring 120 bears against a recessed top partition 112 of the housing 80.

The jointed arm 104 has another link 116 connected to the link 106 by a pivot 114 that forms the joint of the contact arm 104. At its end remote from the pivot 114, the link 116 has a hook 120 located just above a slot 122 in the recessed partition 112. A pin 124 extends from the link 116, near the hook 120, through a slot 130, in the side wall of the housing 80. This pin 124 keeps the right-hand end of the link 116 from moving upwardly, but leaves it free to slide back and forth along the slots 122 and 130.

There is a latch 134 secured to the top of the lever 92. This latch extends upwardly through the slot 122 and into position to prevent movement of the hook 120 toward the left in FIGURE 3. Thus the latch 134, when in raised position, prevents the spring 110 from moving the links 106 and 116 upwardly at the joint of the contact arm 104.

The lever 92 is held in its raised position, with the latch 134 engaging the hook 120, whenever the pressure in the capsule 84 is above the tire pressure at which the invention is intended to provide a signal.

Whenever pressure in the capsule 84 drops below this minimum pressure, the spring 96 moves the lever 92 and latch 134 downwardly out of the path of the hook 120, and this leaves the hook 120 free to move toward the left in response to the pressure of the spring 110.

When the joint of the arm 104 is free to move upwardly, the extent of upward movement is limited by the length of the slot 130. When the pin 124 moves to the left and strikes the end of the slot 130, there can be no further folding of the jointed contact arm 104. The upward movement of the center or jointed portion of the contact arm 104 brings this arm into position to strike the contact 60. As the pressure-responsive device 50 moves past the contact 60, the link 106 rubs along the contact 60 and is depressed, in a clockwise direction in FIGURE 3, as far as necessary to let the center portion of the jointed arm 104 pass across the bottom face of the contact 60. Upon passing beyond the contact 60, the jointed arm 104 again rises at its mid portion and remains in this position until it again strikes the contact 60.

Each time that the jointed arm 104 passes under the contact 60, the jointed arm is moved downwardly far enough to have the hook 120 engage behind the latch 134 if there has been a pressure rise in the capsule 84 sufficient to raise the link 92 and to put the latch 134 into position to engage the hook 120. Thus the pressure-responsive device 50 automatically resets itself on the next revolution of the wheel after a tire has been reinflated, or a new tire installed to take the place of a flat one.

FIGURES 6–8 show a modified construction in which a pressure responsive device 50' is carried by a band 52' clamped to the brake drum 26 in the same manner as already described in connection with the other figures.

The pressure-responsive device 50' has a housing 140 into which the conduit 30 extends. In the illustrated construction, this conduit 30 is held securely in position by a split clamp 142 constituting a part of the housing 140. Within the housing 140, there is a capsule 146 at the end of the conduit 30 and with an axially movable end element 148 which touches a button 150 of a microswitch 152. The construction of the capsule 146 will be described in connection with FIGURE 7a, but after describing the wiring diagrams.

When pressure in the capsule 146 drops below a predetermined limit, the microswitch 152 operates, by its spring bias, to supply power from a battery 154 to a lamp 156. The housing 140 can be made in two parts, one for the battery 154 (which is preferably a flashlight battery) and the other for the capsule 146, switch 152 and lamp 156. By locating the different parts of the housing on opposite sides of the brake drum, dynamic balance can be obtained.

This lamp 156 passes in front of a photoconducting cell 160 carried by a stationary bracket 162 located on the flange 20. The lamp 156 passes in front of the photocell 160 with each revolution of the brake drum 26. If there is no energy being radiated by the lamp 156, the photocell 160 is not affected. Whenever there has been sufficient pressure drop in the pressure-responsive device 50' to light the lamp 156, then a signal is generated in a conductor 166 each time that the pressure-responsive device 50' passes the photocell 160. This signal can be used to operate a relay which controls the circuit containing the signal lights.

Since light from the lamp 156 must reach the photocell 160, and since the apparatus is located on a part of the vehicle which may become very dirty, there is a brush 170 on the pressure-responsive device 50' in position to brush across the face of the photocell 160 each time that the pressure-responsive device 50′ passes the photocell 160. There is a similar brush 172 on the photocell in position to brush across the face of the lamp 156 each time that the pressure-responsive device 50′ passes the photocell 160.

FIGURE 9 shows a wiring diagram for the apparatus illustrated in FIGURES 1–3. The link 106 is grounded and the contact 60 is connected by the conductor 64, through the indicator lamp 68. The other side of the indicator lamp 68 is connected with a battery 178. The wiring diagram of FIGURE 9 is the same as that of FIGURE 5 but with the additional diagrammatic showing of the contact 60 and link 106 of the contact arm 104.

FIGURE 10 is a wiring diagram for the modified form of the invention shown in FIGURES 6–8. This diagram shows a contact element 182, of the microswitch 152, with a bias toward a fixed contact 184. The contacts 182 and 184 touch one another unless a constant force is maintained on the button 150 to hold the switch open. This force is maintained by the end element 148 of the pressure capsule of the pressure-responsive device which operates the microswitch 152.

FIGURE 7a shows the interior construction of the capsule 146. This capsule includes a bushing 190 which is inserted into the end of the conduit 30. The conduit hose is clamped or securely sealed to an end portion of the bushing 190.

A bulb 192 is secured to the other end portion of the bushing 190 and a portion of the bulb 192 extends beyond the end of the bushing. The bushing and bulb fit tightly into a cylindrical housing 194. The bulb bushing assembly is sealed in the housing 194 by sealing material 196.

There is a piston 197 in the housing 194. This piston preferably has a concave lower face with which the bulb 192 contacts. The upper end of the piston 197 connects with the axiliary movement end element 148. This end element 148 extends through a gland 198 which screws into the upper end of the housing 146. A spring 199 is compressed between the gland 198 and the upper end of the piston 197. This spring 199 holds the piston 198 against the bulb 192.

Whenever pressure is admitted into the bulb 192, the bulb elongates axially, it being held against radial expansion by the wall of the housing 194. This axial expansion of the bulb 192 pushes the piston 197 against the pressure of the spring 199 and causes the movable end element 148 to project progressively further from the gland 198 as the pressure in the bulb increases. The degree of displacement of the end element 148 for any given pressure of fluid admitted to the bulb 192 can be controlled by replacing the spring 199 with a stronger or weaker spring; and more accurate adjustments of the pressure displacement ratio can be obtained by screwing the gland 198 further into or out of the threads at the end of the housing 146. There is a lock nut 200 threaded on the gland 198 for locking the gland in any adjusted position. This capsule illustrated in FIGURE 7a is capable of being made in extremely small sizes and is of inexpensive construction.

The preferred embodiments of the invention have been illustrated and described, but changes and modifications can be made and some features can be used in different combinations without departing from the invention as defined in the claims.

What is claimed is:

1. Apparatus for indicating reduction in air pressure in a vehicle tire including, in combination, a pressure-responsive device attached to a rotating part of a wheel on which is mounted the tire in which a reduction in pressure is to be determined, a conduit through which pressure in the tire is transmitted to the pressure-responsive device, a movable portion of the pressure-responsive device that shifts into a signal-producing position when pressure of the air in the conduit drops below a predetermined value, a detector secured to a portion of the vehicle at a location close to the path traveled by the pressure-responsive device as said device rotates with the wheel, the detector being actuated by the pressure-responsive device each time that the pressure responsive device passes the detector only when the movable portion of the pressure-responsive device is in signal-producing position, and an indicator on the vehicle operated by the detector for warning an operator of the vehicle of the drop in pressure of the tire, the movable portion of the pressure-responsive device being an electric switch, and said device including an element that radiates energy when the switch is in closed position, the detector being responsive to the energy radiated, and a lamp for radiating the energy, the detector being a light-responsive element.

2. The apparatus described in claim 1 characterized by a brush for removing dirt from the space between the lamp and the light-responsive device.

3. The apparatus described in claim 2 characterized by two brushes, one of which is carried by the wheel in position to brush the light-responsive device with each revolution of the wheel, and the other of which is carried on a stationary part of the vehicle in position to brush the lamp with each revolution of the wheel.

4. A pressure-operated capsule comprising a tube made of resilient material and of substantial axial length, one end of the tube being sealed closed and the other end connected to a source of fluid pressure to be checked, a housing including two portions which contact with the outside of the tube on different sides thereof, and one of which is fixed and the other movable with respect to the fixed portion and in a direction transverse of the axis of the tube, and a lever connected to the movable portion of the housing and having a relatively fixed fulcrum located in position to cause the lever to transmit movement of the tube wall with a mechanical advantage that gains displacement during changes in the fluid pressure in the tube, and yielding means urging the movable portion of the housing against the wall of the tube.

5. The pressure-operated capsule described in claim 4 characterized by a relatively fixed frame to which the fixed portion of the housing and the fulcrum are attached, the frame, the yielding means being a spring that urges the housing and having the fulcrum in a fixed position on the frame, the yielding means being a spring that urges the lever closer to the housing, and a pivot connection joining the lever to the movable portion of the housing at a location intermediate the fulcrum and the spring, a toggle linkage pivotally connected at one end to the fixed frame and extending generally parallel to the lever when in a generally straight condition, a latch operably connected to the lever remote from the fulcrum, an abutment on the toggle linkage in position to contact with the latch and hold the toggle linkage generally straight, and spring means urging the latch out of the path of the abutment as the diameter of the tube decreases, and spring means urging the toggle linkage into an angle relation when the latch releases said abutment.

6. Apparatus for indicating reduction in air pressure in a vehicle tire including, in combination, a pressure-responsive device attached to a rotating part of a wheel on which is mounted the tire in which a reduction in pressure is to be determined, said device comprising a resilient tube, a housing in which the tube extends, a shoe that contacts with the outside circumference of the tube, a contact operably connected with the housing and movable between a retracted position and an extended signal-producing position, and a leverage system carried by the housing and connecting the shoe with said contact and having lever arms that multiply the shoe displacement which is caused by radial expansion of the tube to obtain substantially greater displacement of the contact and to move said contact into retracted position when the tube expands radially, a conduit through which pressure in the tire is transmitted to the tube to expand the tube, a detector secured to a portion of the vehicle at a location close to the path traveled by the contact of said pressure-responsive device as said device rotates with the wheel, the detector being actuated by the pressure-responsive device each time that the pressure-responsive device passes the detector only when the movable portion of the pressure-responsive device is in signal-producing position, and an indicator on the vehicle operated by the detector for warning an operator of the vehicle of the drop in pressure of the tire.

7. The apparatus described in claim 6 characterized by the contact being an element that extends lengthwise in a direction that slopes rearwardly at an acute angle to a tangent to the circular path of movement of the part of the contact that touches the detector.

8. The apparatus described in claim 7 characterized by the contact including a second element that forms with the first element a toggle linkage that moves toward a flatter condition upon contact of the first element with said detector.

9. A pressure-operated capsule including a tubular housing enclosing a cylindrical chamber of fixed diameter, a piston movable axially in the cylindrical chamber of the housing, an elongated bulb in the housing and of the same diameter as the cylindrical chamber in the housing, the bulb having a substantial portion of its length of cylindrical cross section and in contact with the cylindrical wall of the chamber, the bulb being in contact with the cylindrical wall of the chamber and being limited thereby to expansion only in the direction of the piston, the bulb being on one side of the piston and in contact therewith for moving the piston in one direction in response to change in pressure in the bulb as the bulb is inflated, a plunger in the housing on the side of the piston opposite the bulb, the plunger extending axially of the tubular housing and beyond one end of the housing by a distance dependent upon the position of the piston, a conduit opening through the other end of the housing and communicating with the interior of the bulb, and spring means urging the plunger and the piston to move in the housing in the opposite direction to that in which the piston is moved by the bulb, the plunger being a piston rod of unitary construction with the piston.

10. Apparatus for indicating reduction in air pressure in a vehicle tire including, in combination, a pressure-responsive device attached to a rotating part of a wheel on which is mounted the tire in which a reduction in pressure is to be determined, said device comprising a pressure-operated capsule including a tubular housing enclosing a cylindrical chamber of fixed diameter, a piston movable axially in the cylindrical chamber of the housing, an elongated bulb in the housing and of the same diameter as the cylindrical chamber in the housing, the bulb having a substantial portion of its length of cylindrical cross section and in contact with the cylindrical wall of the chamber, the bulb being in contact with the cylindrical wall of the chamber and being limited thereby to expansion only in the direction of the piston, the bulb being on one side of the piston and in contact therewith for moving the piston in one direction in response to change in pressure in the bulb as the bulb is inflated, a plunger in the housing on the side of the piston opposite the bulb, the plunger extending axially of the tubular housing and beyond one end of the housing by a distance dependent upon the position of the piston, a conduit opening through the other end of the housing and communicating with the interior of the bulb, and spring means urging the plunger and the piston to move in the housing in the opposite direction to that in which the piston is moved by the bulb, the plunger being a piston rod of unitary construction with the piston, electric switch means operated by movement of the plunger, between different positions, said conduit which opens through the end of the housing serving as a conduit through which pressure in the tire is transmitted to the bulb to expand the bulb, a detector secured to a portion of the vehicle, the detector being responsive to the condition of the switch means each time that means passes the pressure-responsive device when the electric switch means is in one position of the switch means, and an indicator of the vehicle operated by the detector for warning the operator of the vehicle of the drop in pressure of the tire.

References Cited by the Examiner
UNITED STATES PATENTS

| | | | |
|---|---|---|---|
| 2,260,246 | 10/1941 | Woodruff et al. | 340—58 |
| 2,958,746 | 11/1960 | Hawkins | 340—58 |
| 2,966,658 | 12/1960 | O'Neill | 340—58 |
| 3,117,195 | 1/1964 | Woodfill et al. | 340—58 |

NEIL C. READ, *Primary Examiner.*